US012784417B2

(12) United States Patent
Inagi

(10) Patent No.: US 12,784,417 B2
(45) Date of Patent: Nov. 3, 2026

(54) IMAGE GENERATION APPARATUS, IMAGE GENERATION METHOD, IMAGE GENERATION PROGRAM, LEARNING DEVICE, AND LEARNING DATA

(71) Applicant: FUJIFILM Corporation, Tokyo (JP)

(72) Inventor: Seiya Inagi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 133 days.

(21) Appl. No.: 18/744,895

(22) Filed: Jun. 17, 2024

(65) Prior Publication Data

US 2024/0338933 A1 Oct. 10, 2024

Related U.S. Application Data

(63) Continuation of application No. PCT/JP2022/041668, filed on Nov. 9, 2022.

(30) Foreign Application Priority Data

Dec. 21, 2021 (JP) ................................ 2021-207200

(51) Int. Cl.
*G06V 10/774* (2022.01)
*G06T 5/20* (2006.01)
(Continued)

(52) U.S. Cl.
CPC .............. *G06V 10/774* (2022.01); *G06T 5/20* (2013.01); *G06T 5/50* (2013.01); *G06T 5/60* (2024.01);
(Continued)

(58) Field of Classification Search
CPC ...... G06V 10/774; G06V 10/40; G06V 10/82; G06V 10/44; G06V 10/761; G06V 10/764;
(Continued)

(56) References Cited

U.S. PATENT DOCUMENTS 10,849,585 B1 12/2020 Teixeira et al.
12,555,284 B2 * 2/2026 Goshen .................. G06T 11/00

FOREIGN PATENT DOCUMENTS

CN 107851176 A * 3/2018 ............. A61B 1/045
CN 112509075 A * 3/2021 ............. G06N 3/045
(Continued)

OTHER PUBLICATIONS

Zhang, Z et al.; "Joint Optimization of CycleGAN and CNN Classifier for Detection and Localization of Retinal Pathologies on Color Fundus Photographs"; IEEE Journal of Biomedical and Health Informatics; Jul. 1, 2021; pp. 115-126; vol. 26, No. 1; IEEE; USA; XP011898110; ISSN: 2168-2194; DOI: 10.1109/JBHI.2021.3092339; URL: https://ieeexplore.ieee.org/document/9470973.
(Continued)

*Primary Examiner* — Jose L Couso
(74) *Attorney, Agent, or Firm* — Studebaker Brackett PLLC

(57) ABSTRACT

Provided are an image generation apparatus, an image generation method, an image generation program, a learning device, and learning data that efficiently create appropriate learning data. An image generation apparatus (1) including a first processor receives an input of pseudo object region data (31) indicating any pseudo object region and an original image (33). The first processor generates a pseudo residual image (35) to be added to the original image based on the pseudo object region data (31). The first processor adds the generated pseudo residual image (35) and the original image (33) to generate a pseudo image (42) obtained in a case in which a pseudo object region is present in the original image (33). Thereby, the image generation apparatus (1) creates learning data consisting of a pair of the pseudo image (42) and the pseudo object region data (31).

20 Claims, 10 Drawing Sheets

(51) Int. Cl.

| | |
|---|---|
| ***G06T 5/50*** | (2006.01) |
| ***G06T 5/60*** | (2024.01) |
| ***G06T 5/70*** | (2024.01) |
| ***G06V 10/40*** | (2022.01) |
| ***G06V 10/82*** | (2022.01) |

(52) U.S. Cl.

CPC ................ *G06T 5/70* (2024.01); *G06V 10/40* (2022.01); *G06V 10/82* (2022.01); *G06T 2207/10116* (2013.01); *G06T 2207/20032* (2013.01); *G06T 2207/20081* (2013.01); *G06T 2207/20084* (2013.01); *G06T 2207/20212* (2013.01)

(58) Field of Classification Search

CPC ......... G06V 2201/03; G06V 2201/031; G06V 2201/033; G06V 20/70; G06V 10/454; G06V 10/54; G06V 10/7764; G06V 10/84; G06V 20/41; G06V 30/18057; G06V 20/698; G06V 30/19173; G06V 30/194; G06T 5/20; G06T 5/50; G06T 5/60; G06T 5/70; G06T 2207/10116; G06T 2207/20032; G06T 2207/20081; G06T 2207/20084; G06T 2207/20212; G06T 2207/30136; G06T 5/77; G06T 7/0004; G06T 11/00; G06T 7/194; G06T 7/30; G06T 7/0012; G06T 7/0014; G06T 7/0016; G06T 7/11; G06T 7/70; G06T 2207/10081; G06T 2207/10088; G06T 2207/20021; G06T 2207/30004; G06T 2207/30016; G06T 2207/30096; G06T 11/03; G06T 3/4046; G06T 9/002; G06T 2207/20076; G06T 2211/441; A61B 5/0033; A61B 5/7267; G06N 3/02; G06N 3/08–088; G06N 3/04; G06N 3/0445; G06N 3/0454; G06N 3/0464; G06N 3/4046; G06N 3/4053; G06N 3/049; G06N 3/0499; G06N 7/00; G06N 7/01; G06N 20/00; G06K 7/1482; G06F 18/213; G06F 18/214; G06F 18/22; G06F 18/241; G06F 18/24; G06F 18/2411; G06F 18/2415; G06F 18/253; G06F 30/27; Y10S 128/925

See application file for complete search history.

(56) References Cited

FOREIGN PATENT DOCUMENTS

| | | | | | |
|---|---|---|---|---|---|
| CN | 112509076 A | * | 3/2021 | ............. G06N 3/045 |
| CN | 112733744 A | * | 4/2021 | ............. G06V 20/20 |
| CN | 112802046 A | * | 5/2021 | ............. G06N 3/045 |
| CN | 113449727 A | * | 9/2021 | ........... G06F 18/253 |
| JP | 2018-124939 A | | 8/2018 | |
| JP | 2019-46269 A | | 3/2019 | |
| JP | 2019046269 A | * | 3/2019 | |
| JP | 2019-120985 A | | 7/2019 | |

OTHER PUBLICATIONS

Extended European Search Report issued in EP 22 91 0641.4-1218 by the European Patent Office on May 2, 2025, which is related to U.S. Appl. No. 18/744,895.

International Search Report issued in PCT/JP2022/041668; mailed Jan. 17, 2023.

Written Opinion of the International Searching Authority issued in PCT/JP2022/041668; mailed Jan. 17, 2023.

"Notice of Reasons for Refusal" Office Action issued in JP 2023-569146; mailed by the Japanese Patent Office on Jun. 17, 2026.

* cited by examiner

IMAGE GENERATION APPARATUS, IMAGE GENERATION METHOD, IMAGE GENERATION PROGRAM, LEARNING DEVICE, AND LEARNING DATA

CROSS-REFERENCE TO RELATED APPLICATIONS

The present application is a Continuation of PCT International Application No. PCT/JP2022/041668 filed on Nov. 9, 2022 claiming priority under 35 U.S.C § 119(a) to Japanese Patent Application No. 2021-207200 filed on Dec. 21, 2021. Each of the above applications is hereby expressly incorporated by reference, in its entirety, into the present application.

BACKGROUND OF THE INVENTION

1. Field of the Invention

The present invention relates to an image generation apparatus, an image generation method, an image generation program, a learning device, and learning data, and particularly relates to a technology for efficiently generating learning data.

2. Description of the Related Art

In the related art, a training data generation system has been proposed that automatically generates a large amount of appropriate training data for machine learning (learning data) in a short time (JP2019-46269A).

This training data generation system acquires an original sample image and an original label image corresponding to the original sample image. The original sample image is an image such as a photograph that can be used as an input image during machine learning, and the original label image is an appropriate label image that is manually generated from an original sample image that can be used as an output image during machine learning.

A similar image generation unit of the training data generation system generates an image similar to the original label image as a pseudo label image, based on a generative adversarial network (GAN) such as deep convolutional generative adversarial networks (DCGANS), for example.

In addition, the similar image generation unit of the training data generation system generates an image that is analogous to the pseudo label image (an analogous image) according to conversion characteristics from the original label image to the original sample image, as a pseudo sample image corresponding to the pseudo label image. For example, an analogous image generation unit searches in the original label image for a pixel whose surrounding region has a pixel value distribution closest to the pixel value distribution of a surrounding region of an attention pixel (a window of a predetermined size including an attention pixel), with each pixel of the pseudo label image as the attention pixel, and generates a pseudo sample image by setting a pixel value of the original sample image at the same position as the position of the found pixel to a pixel at the same position in the pseudo sample image.

Thereby, a large number of pairs (pseudo training data) of pseudo sample images and pseudo label images that correspond to each other are generated.

SUMMARY OF THE INVENTION

One embodiment according to the technology of the present disclosure provides an image generation apparatus, an image generation method, an image generation program, a learning device, and learning data that efficiently generate appropriate learning data.

According to a first aspect of the present invention, there is provided an image generation apparatus comprising a first processor, in which the first processor is configured to perform: first reception processing of receiving an input of pseudo object region data indicating any pseudo object region; and pseudo residual image generation processing of generating a pseudo residual image showing a change in a pixel value given to an original image by a presence of a pseudo object in the pseudo object region, based on the pseudo object region data.

According to the first aspect of the present invention, it is possible to reduce the burden on pseudo residual image generation processing of generating a pseudo residual image to be added to the original image based on the pseudo object region data. This is because, in the pseudo residual image generation processing, the pseudo object region data is focused on, and a residual (pseudo residual) in the pseudo object region data is generated.

It is preferable that image generation apparatus according to a second aspect of the present invention further comprises a second processor, in which the second processor is configured to perform: second reception processing of receiving an input of first learning data in which an object region is present and at least object region data indicating the object region of the first learning data out of the object region data and the pseudo object region data; processing of generating a residual image showing a change in a pixel value given to the first learning data by a presence of an object in the object region, based on the first learning data and the object region data; and processing of generating a first learning model that generates a pseudo residual image corresponding to the residual image from the object region data based on the residual image and at least the object region data out of the object region data and the pseudo object region data, and the pseudo residual image generation processing is executed by the first learning model that has been trained. By focusing only on the residual, it is possible to reduce the burden on the learning model that generates the pseudo residual image.

It is preferable that, in the image generation apparatus according to a third aspect of the present invention, the processing of generating the residual image includes performing interpolation processing on an image of an object region indicated by the object region data of the first learning data, generating pseudo first learning data in which the change in the pixel value given to the first learning data by the presence of the object is reduced, and generating the residual image based on the first learning data and the pseudo first learning data.

It is preferable that, in the image generation apparatus according to a fourth aspect of the present invention, the interpolation processing is processing using polynomial interpolation, spline interpolation, linear interpolation, parabolic interpolation, or cubic interpolation.

It is preferable that, in the image generation apparatus according to a fifth aspect of the present invention, the residual image is generated by subtraction or division between the first learning data and the pseudo first learning data.

It is preferable that, in the image generation apparatus according to a sixth aspect of the present invention, the second processor is configured to perform first noise reduction processing of reducing noise from the first learning data, and use the first learning data that has been subjected to the first noise reduction processing to generate the residual image. Thereby, in training the learning model that generates the pseudo residual image, it is possible to suppress variations in noise level that are present between the pieces of first learning data and reduce a learning load.

It is preferable that, in the image generation apparatus according to a seventh aspect of the present invention, the first noise reduction processing is denoising processing using an NLM filter, a median filter, a moving average filter, or a Gaussian filter.

It is preferable that, in the image generation apparatus according to an eighth aspect of the present invention, the object region is a region in each image determined based on a specific criterion for an image group.

It is preferable that, in the image generation apparatus according to a ninth aspect of the present invention, the object region is a defect region that appears in an X-ray image of a metal component.

It is preferable that, in the image generation apparatus according to a tenth aspect of the present invention, the first reception processing includes receiving an input of the original image, and the first processor is configured to perform pseudo image generation processing of generating a pseudo image by combining the pseudo residual image and the original image. By combining the original image and the pseudo residual image, a pseudo image obtained in a case in which a pseudo object region is present in the original image is generated.

It is preferable that, in the image generation apparatus according to an eleventh aspect of the present invention, the pseudo image generation processing includes generating the pseudo image by addition or multiplication of the pseudo residual image and the original image.

It is preferable that, in the image generation apparatus according to a twelfth aspect of the present invention, the first processor is configured to perform second noise reduction processing of reducing noise in at least the pseudo object region of the original image before combining the pseudo residual image and the original image.

Thereby, in the pseudo image generated by the combination, it is possible to reduce variations in image texture due to competition between noise components present in the pseudo residual image and noise components originally present in the original image.

It is preferable that, in the image generation apparatus according to a thirteenth aspect of the present invention, the second noise reduction processing includes performing interpolation processing on an image in the pseudo object region.

It is preferable that, in the image generation apparatus according to a fourteenth aspect of the present invention, the interpolation processing is processing using polynomial interpolation, spline interpolation, linear interpolation, parabolic interpolation, or cubic interpolation.

It is preferable that, in the image generation apparatus according to a fifteenth aspect of the present invention, the first processor is configured to generate learning data consisting of a pair of the pseudo image and the pseudo object region data.

It is preferable that, in the image generation apparatus according to a sixteenth aspect of the present invention, the first reception processing includes receiving an input of a plurality of pieces of the pseudo object region data in which at least one of a position, a size, or a shape of the pseudo object region is different, and the first processor is configured to generate the learning data for each of the plurality of pieces of received pseudo object region data for the one original image. Thereby, appropriate learning data can be automatically and efficiently generated.

According to a seventeenth aspect of the present invention, there is provided a learning device comprising a third processor, in which the third processor is configured to: acquire the learning data generated by the image generation apparatus according to the fifteenth or sixteenth aspect; and generate a second learning model that extracts a region of an object from an image including the object based on the learning data.

According to an eighteenth aspect of the present invention, there is provided an image generation method executed by an image generation apparatus including a first processor, the image generation method comprising: a step of receiving, by the first processor, an input of pseudo object region data indicating any pseudo object region; and a step of generating, by the first processor, a pseudo residual image showing a change in a pixel value given to an original image by a presence of a pseudo object in the pseudo object region, based on the pseudo object region data.

It is preferable that, in the image generation method according to a nineteenth aspect of the present invention, the image generation apparatus includes a second processor, the image generation method further comprises: a step of receiving, by the second processor, an input of first learning data in which an object region is present and at least object region data indicating the object region of the first learning data out of the object region data and the pseudo object region data; a step of generating, by the second processor, a residual image showing a change in a pixel value given to the first learning data by a presence of an object in the object region, based on the first learning data and the object region data; and a step of generating, by the second processor, a first learning model that generates a pseudo residual image corresponding to the residual image from the object region data based on the residual image and at least the object region data out of the object region data and the pseudo object region data, and the step of generating the pseudo residual image is executed by the first learning model that has been trained.

It is preferable that the image generation method according to a twentieth aspect of the present invention further comprises: a step of receiving, by the first processor, an input of the original image; and a step of generating, by the first processor, a pseudo image by combining the pseudo residual image and the original image.

It is preferable that the image generation method according to a twenty-first aspect of the present invention further comprises: a step of generating, by the first processor, learning data consisting of a pair of the pseudo image and the pseudo object region data.

According to a twenty-second aspect of the present invention, there is provided an image generation program causing the first processor to execute processing of each step in the image generation method according to any one of the eighteenth to twenty-first aspects.

According to a twenty-third aspect of the present invention, there is provided learning data consisting of a pair of a pseudo image and pseudo object region data, in which the pseudo object region data is data indicating any pseudo object region, the pseudo image is an image obtained by combining a pseudo residual image and an original image, and the pseudo residual image is an image showing a change in a pixel value given to the original image by a presence of a pseudo object in the pseudo object region.

It is preferable that, in the learning data according to a twenty-fourth aspect of the present invention, the pseudo object region data includes a plurality of pieces of the pseudo object region data in which at least one of a position, a size, or a shape of the pseudo object region is different.

According to one aspect of the present invention, it is possible to generate a pseudo residual image to be added to an original image based on pseudo object region data indicating any pseudo object region. According to another aspect of the present invention, it is possible to generate a pseudo image by combining an original image and a pseudo residual image. This pair of the pseudo image and pseudo object region data can be used as learning data, and appropriate learning data used for machine learning of a learning model that extracts object regions in images can be automatically and efficiently generated.

DESCRIPTION OF THE PREFERRED EMBODIMENTS

Hereinafter, preferred embodiments of an image generation apparatus, method, and program, a learning device, and learning data according to aspects of the present invention will be described with reference to the accompanying drawings.

Hardware Configuration of Image Generation Apparatus

Figure 1:
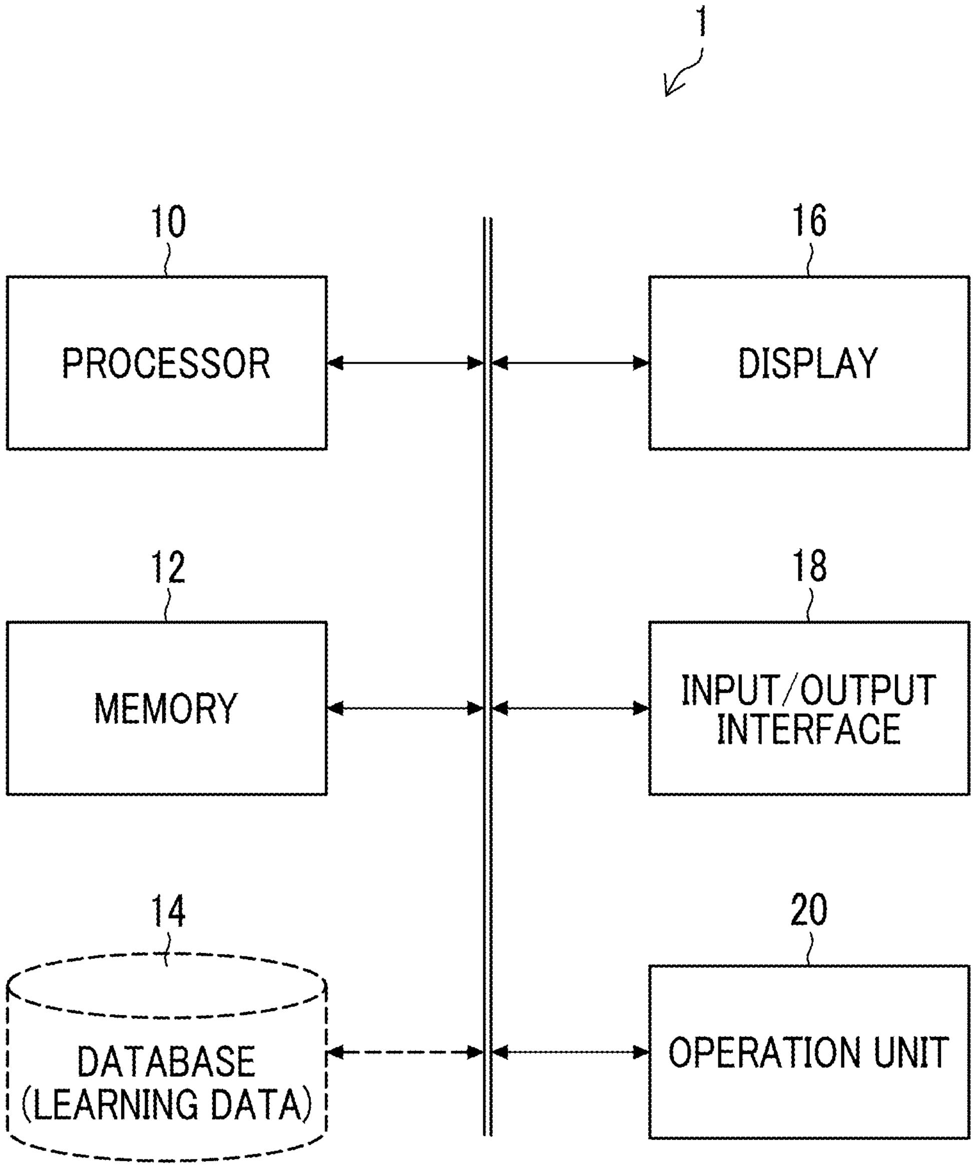
FIG. 1 is a block diagram showing an embodiment of a hardware configuration of an image generation apparatus according to an aspect of the present invention.

FIG. 1 is a block diagram showing an embodiment of a hardware configuration of an image generation apparatus according to an aspect of the present invention.

An image generation apparatus 1 shown in FIG. 1 is an apparatus that automatically generates learning data used for machine learning of a learning model, is constituted by a personal computer, a workstation, or the like, and comprises a processor (first processor) 10, a memory 12, a database 14, a display 16, an input/output interface 18, an operation unit 20, and the like.

The processor 10 is composed of a central processing unit (CPU) or the like, and functions as a processing unit that performs overall control of each unit of the image generation apparatus 1 and performs various processes for automatically generating learning data by executing an image generation program.

The memory 12 includes a flash memory, a read-only memory (ROM), a random-access memory (RAM), a hard disk apparatus, and the like. The flash memory, the ROM, or the hard disk apparatus is a non-volatile memory that stores an operating system, various programs including an image generation program according to an aspect of the present invention, and the like. The RAM functions as a work area for processing by the processor 10, and also temporarily stores learning data generation programs and the like stored in a flash memory or the like. The processor 10 may incorporate a part (RAM) of the memory 12.

The database 14 stores and manages first learning data for training a pseudo residual image generation model, which will be described later, first pseudo object region data, an original image, learning data generated by the image generation apparatus 1, and the like.

Note that the database 14 may be included in the image generation apparatus 1 or may be provided externally apart from the image generation apparatus 1. Furthermore, the database 14 is not limited to one, but may be composed of a plurality of databases that are managed separately depending on the storage management content of the data to be stored.

The processor 10 acquires necessary data such as first learning data and original images from the database 14 according to the image generation program, using the RAM as a work area, and controls and processes each unit of the image generation apparatus 1.

The display 16 can display an original image, pseudo object region data, learning data generated by the image generation apparatus 1, and the like, which will be described later. By checking the learning data displayed on the display 16, a user can confirm whether or not appropriate learning data has been generated. Note that the display 16 is also used as part of a graphical user interface (GUI) in a case of receiving various types of information from the operation unit 20.

The input/output interface 18 includes a connecting part that can be connected to an external apparatus, a communicating part that can be connected to a network, and the like. As a connecting part that can be connected to an external apparatus, a universal serial bus (USB), a high-definition multimedia interface (HDMI (Registered Trademark)), or the like can be applied. The processor 10 can acquire desired data from the outside via the input/output interface 18 or output desired data to the outside.

The operation unit 20 includes a pointing device such as a mouse, a keyboard, and the like, and functions as a part of a GUI that receives an input of various types of information and instructions from the user.

Embodiment of Image Generation Apparatus

Figure 2:
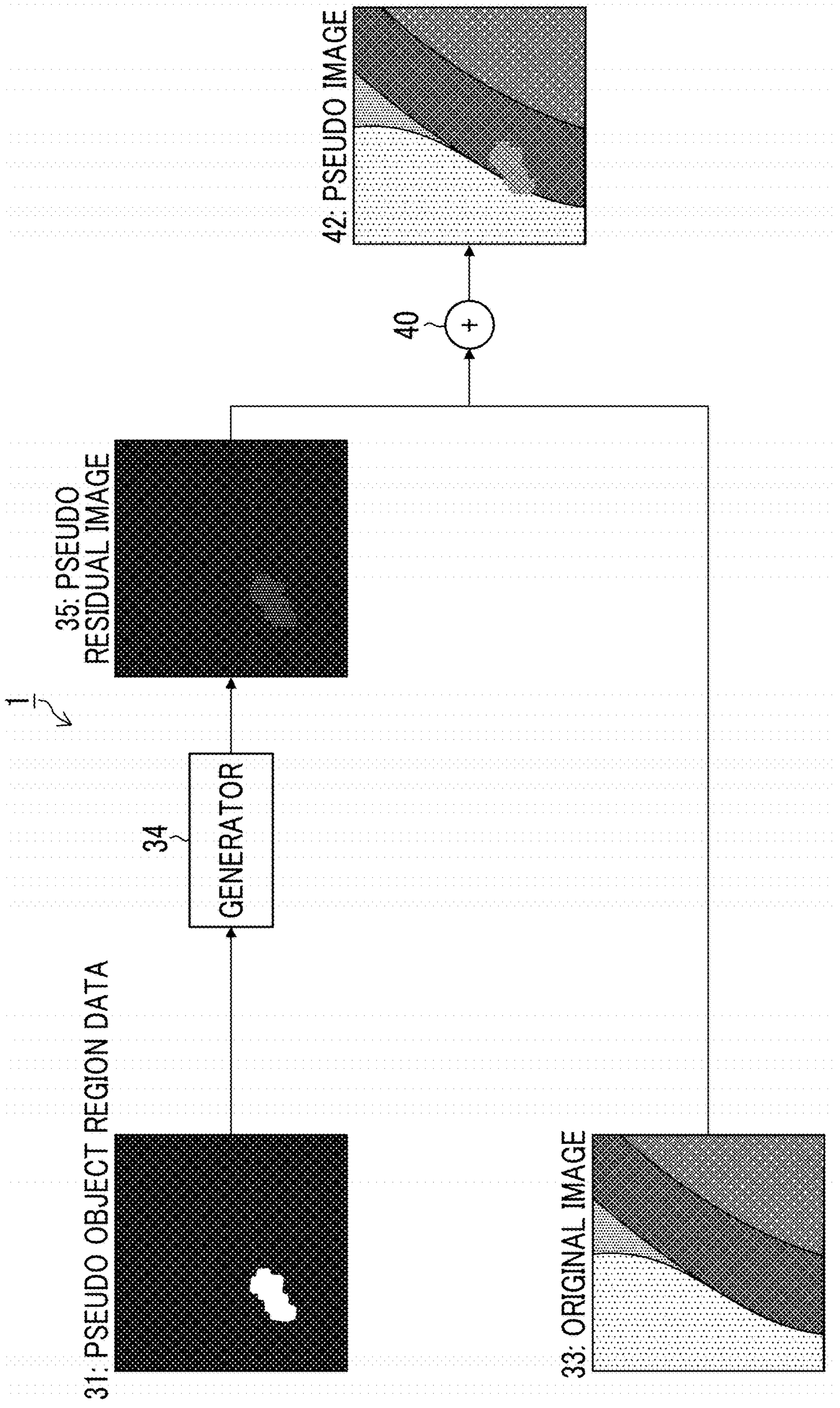
FIG. 2 is a functional block diagram showing an embodiment of the image generation apparatus according to the aspect of the present invention.

FIG. 2 is a functional block diagram showing an embodiment of the image generation apparatus according to the aspect of the present invention.

The image generation apparatus 1 shown in FIG. 2 comprises a generator 34 that performs pseudo residual image generation processing and an adder 40 that performs pseudo image generation processing. The processor 10 of the image generation apparatus 1 having the hardware configuration shown in FIG. 1 functions as the generator 34 and the adder 40 according to an image generation program.

The processor 10 of the image generation apparatus 1 shown in FIG. 2 performs reception processing (first reception processing) of receiving an input of pseudo object region data 31 indicating any pseudo object region.

Here, an object region is a region in each image that is determined based on a certain criterion for a certain image group, and an object is a target object corresponding to the object region. For example, in a case in which the image is an X-ray image obtained by imaging a metal component, a defect region appearing in the X-ray image is the object region, and the defect in the metal component is the object.

Further, the pseudo object region is a virtual object region generated manually or by simulation.

Hereinafter, in the present example, an X-ray image obtained by imaging a metal component will be described as an example of the image.

An original image 33 is preferably an X-ray image that does not include a defect region (that is, an X-ray image obtained by imaging a metal component without a defect), but may include a defect region.

In the present example, the pseudo object region data 31 is a mask image indicating any pseudo object region, and is, for example, binary data in which the pseudo object region is white and the other regions are black, as shown in FIG. 2. However, the pseudo object region data 31 is not limited to image data such as a mask image, but may also be representative point coordinate data of the pseudo object region, vector data indicating the contour of the pseudo object region, or the like.

The pseudo object region data 31 can be manually generated by the user optionally drawing a pseudo object region using the display 16 and the operation unit 20. In addition, a large amount of pseudo object region data 31 can be easily generated by translating, rotating, scaling, copying, deforming, or the like a pseudo object region of the pseudo object region data 31 or a defect region (object region) of the object region data 30 indicating an actual defect region, which will be described later, through user operations or automatically. That is, it is possible to easily generate pseudo object region data 31 in which at least one of a position, a size, or a shape of the pseudo object region is different.

In a case in which a certain metal component is X-ray imaged and a defect in the metal component is detected from the captured X-ray image, it is assumed that the database 14 has previously stored an X-ray image obtained by imaging a metal component without a defect, as an original image (test data) 33.

In a case in which a learning model that detects a defect in a metal component from an X-ray image is generated, it is necessary to prepare a large amount of learning data to be used for machine learning of the learning model.

In this case, for example, the user gives an instruction to acquire the original image 33 stored in the database 14 using the operation unit 20 or the like, and the processor 10 of the image generation apparatus 1 receives the input of the original image 33. Note that the original image 33 is not limited to that stored in the database 14.

Further, the processor 10 of the image generation apparatus 1 receives the pseudo object region data 31 appropriately generated as described above in accordance with an input instruction or the like from the user.

The generator 34 is a part that performs pseudo residual image generation processing of generating a pseudo residual image 35 to be added to the original image 33 based on the pseudo object region data 31 of which the input is received, and is configured by a trained learning model (for example, U-Net, which is one of fully convolution networks (FCNs)).

Here, the details of the residual image and the pseudo residual image 35 will be described later, but the residual image is an image showing a change in the pixel value given to the first learning data by the presence of an object in an object region of an image (first learning data) in which an object region is present. In other words, the residual image is an image that shows a change (difference or ratio) between an image in which the object region is present and an image in a case in which the object region is not present.

Similarly, the pseudo residual image 35 is an image showing a change in the pixel value given to the original image 33 by the presence of a pseudo object in the pseudo object region in a case in which a pseudo object region corresponding to the pseudo object region data 31 is present in the original image 33. In other words, the pseudo residual image 35 is an image showing a change (difference or ratio) between an image corresponding to the original image 33 (pseudo original image) and the original image 33 in a case in which a pseudo object region is present.

The adder 40 functioning as a pseudo image generation processing unit is a part that generates a pseudo image (a pseudo image obtained in a case in which a pseudo object region is present in the original image 33) 42 by combining the pseudo residual image 35 and the original image 33, and in the present example, the adder 40 adds the original image 33 and the pseudo residual image 35 to generate a pseudo image 42.

Note that the pseudo residual image 35 generated by the generator 34 can also be said to be an image showing the difference between the original image 33 and the pseudo image 42.

Further, the pseudo image 42 is not limited to the case in which it is generated by adding the original image 33 and the pseudo residual image 35, and for example, in a case in which the pseudo residual image is an image that shows the ratio of both images obtained by dividing the pseudo original image by the original image, the pseudo image 42 may be generated by multiplying the original image by the pseudo residual image.

Preferably, the processor 10 stores learning data consisting of a pair of the pseudo image 42 and the pseudo object region data 31 generated in this way in the database 14. Note that the pseudo object region data 31 is correct answer data for the pseudo image 42.

A large amount of pseudo object region data 31 can be easily generated by optionally changing at least one of the position, the size, or the shape of the pseudo object region.

Therefore, in a case of receiving an input of pseudo object region data 31 in which at least one of the position, size, or shape of the pseudo object region is different, for one original image 33, learning data can be generated for each of the plurality of pieces of pseudo object region data that have received the input. That is, a large amount of learning data can be efficiently generated.

The learning data generated in this way can be used to train a learning model (second learning model) that extracts and discriminates object regions from an examination image (in the present example, an X-ray image obtained by imaging a metal component) in a case in which the examination image corresponding to the original image 33 is input.

Embodiment of Processing Unit that Constructs Generator

Figure 3:
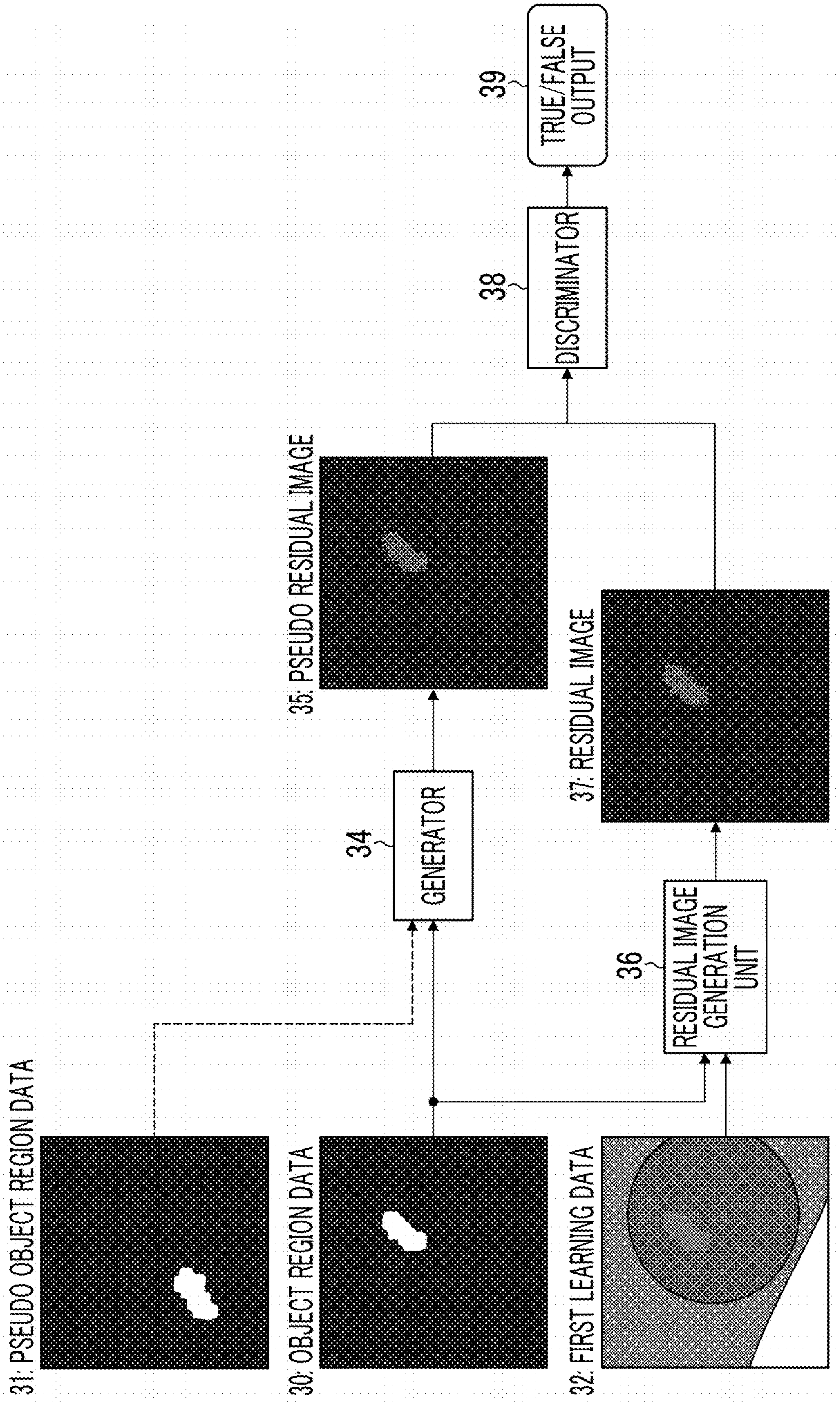
FIG. 3 is a functional block diagram showing an embodiment of a processing unit that constructs a generator that is a pseudo residual image generation model.

FIG. 3 is a functional block diagram showing an embodiment of a processing unit that constructs a generator that is a pseudo residual image generation model.

In FIG. 3, a processing unit that constructs the generator 34 comprises two neural networks, a generator 34 and a discriminator 38 that constitute a generative adversarial network (GAN), and a residual image generation unit 36. The processor 10 of the image generation apparatus 1 having the hardware configuration shown in FIG. 1 functions as the generator 34, the residual image generation unit 36, and the discriminator 38 according to an image generation program.

In the GAN of the present example including the generator 34 and the discriminator 38 shown in FIG. 3, machine learning is performed using a data set of learning data prepared in advance.

Individual pieces of learning data included in the data set are composed of a pair of first learning data 32, which is a learning image in which an object region is present, and object region data 30, which is correct answer data indicating the object region of the first learning data 32. It is assumed that a learning data set is stored in the database 14 in advance.

The processor 10 (second processor) of the image generation apparatus 1 shown in FIG. 2 reads out a pair of the first learning data 32 and the object region data 30 from the database 14, and performs reception processing (second reception processing) of receiving an input of the first learning data 32 and the object region data 30. Note that the processor 10 as the second processor used for learning the GAN in the present example may be physically independent from the processor 10 as the first processor that generates the pseudo residual image 35 and the pseudo image 42 shown in FIG. 2, or may be integrated therewith.

The residual image generation unit 36 performs processing to generate a residual image 37 based on the first learning data 32 and the object region data 30.

As described above, the residual image 37 is an image showing a change in the pixel value given to the first learning data by the presence of an object in an object region of an X-ray image (in the present example, the first learning data) in which an object region is present.

Embodiment of Residual Image Generation Unit

Figure 4:
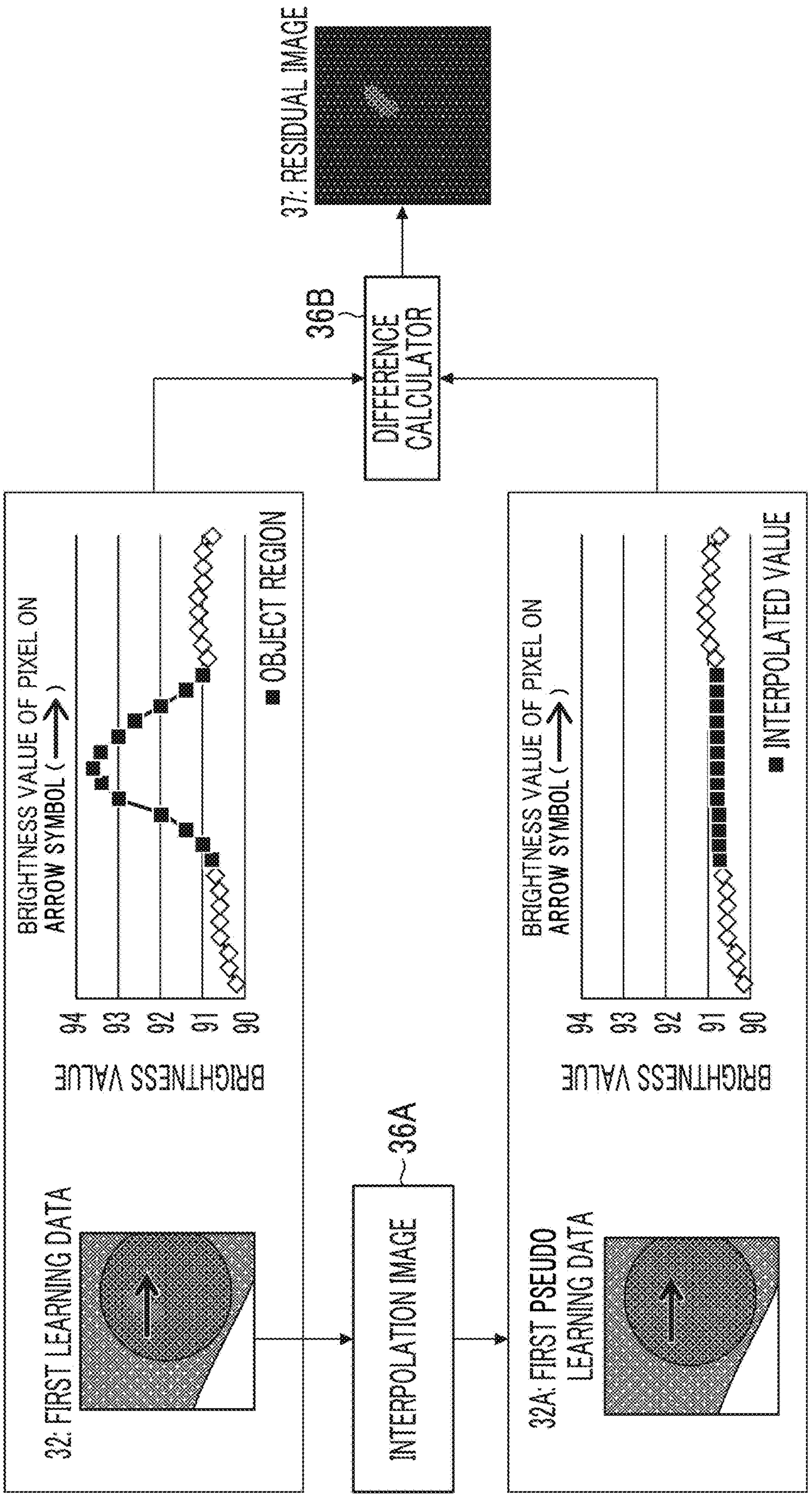
FIG. 4 is a diagram showing an embodiment of a residual image generation unit.

FIG. 4 is a diagram showing an embodiment of the residual image generation unit.

As shown in FIG. 4, the residual image generation unit 36 comprises an interpolation processing unit 36A and a difference calculator 36B.

In the first learning data 32, an object region (defect region) is present at a location indicated by an arrow. The object region has a different brightness value (pixel value) from the surrounding region thereof. In the object region shown in FIG. 4, a brightness value of each pixel in a direction indicated by an arrow as shown in the graph in FIG. 4 is higher than that in a surrounding region. Note that in a case of an X-ray image obtained by imaging a metal component, depending on the type of defect, the brightness value of pixels in the defect region may be lower than that in the surrounding region.

The interpolation processing unit 36A, which receives the input of the first learning data 32, interpolates the brightness value of the pixel of the object region indicated by the object region data 30 of the first learning data 32 to the brightness value obtained by the interpolation algorithm, and generates pseudo first learning data 32A, which is an interpolated image.

In the object region of the pseudo first learning data 32A subjected to the interpolation processing, as shown in the graph in FIG. 4, the brightness values (interpolated values) of each pixel in the direction indicated by the arrow are smoothly continuous brightness values that are equivalent to the brightness values of the surrounding region. That is, the interpolation processing unit 36A performs interpolation processing on the first learning data 32 in which the object region is present to become learning data (pseudo first learning data 32A) for the case in which the object region is not present.

As the interpolation processing in the interpolation processing unit 36A, processing using polynomial interpolation, spline interpolation, linear interpolation, parabolic interpolation, or cubic interpolation can be applied.

The difference calculator 36B generates a residual image 37 based on the first learning data 32 and the pseudo first learning data 32A, but the difference calculator 36B in the present example subtracts the pseudo first learning data 32A from the first learning data 32 to generate a residual image 37. That is, the residual image 37 is an image showing a change in the brightness value (pixel value) given to the first learning data 32 by the presence of an object in the object region, and the pixel values in regions other than the object region are zero.

Alternatively, the first learning data 32 may be divided by the pseudo first learning data 32A, and an image showing the ratio of both data may be used as the residual image.

Referring back to FIG. 3, the generator 34 uses at least the object region data 30 of the object region data 30 and the pseudo object region data 31 as input data, and machine learning is performed on the generator 34 to generate a pseudo residual image 35 corresponding to the residual image 37 generated by the residual image generation unit 36 from the object region data 30.

Machine learning is performed on the discriminator 38 to accurately discriminate whether the residual image 37 and the pseudo residual image 35 are true or false.

In the generative adversarial network (GAN), a true residual image 37 and a false pseudo residual image 35 generated by the generator 34 are individually input to the discriminator 38. The discriminator 38 discriminates whether the input image is a residual image 37 or a pseudo residual image 35, and performs a true/false output 39 indicating the discrimination result. For example, in a case in which the residual image 37 is input to the discriminator 38 and it is discriminated to be a true residual image, the discrimination result is "true", and in a case in which the pseudo residual image 35 is input to the discriminator 38 and it is discriminated to be a true residual image, the discrimination result is "false".

In the discriminator 38, the parameters of the neural network are updated so that the discrimination result becomes "true" based on a loss function for the discriminator according to the true/false output 39. That is, the discriminator 38 is trained so that it can accurately discriminate between true and false.

On the other hand, the parameters of the neural network of the generator 34 are updated so that the discrimination result becomes "false" based on a loss function for the generator according to the true/false output 39 of the discriminator 38.

That is, the generator 34 learns to generate a pseudo residual image 35 that is more likely to be true, so that it is difficult for the discriminator 38 to discriminate between true and false, while the discriminator 38 learns to discriminate between true and false with higher accuracy.

Using a large number of data sets, the learning of the discriminator 38 and the generator 34 is repeated, and as the learning progresses, the generator 34 can generate a pseudo residual image 35 that is difficult to discriminate from the "true" residual image 37.

The generator 34 shown in FIG. 2 is a trained generator 34 that has been trained as described above, and the generator 34 can generate a false pseudo residual image 35 whose true/false cannot be discriminated by the discriminator 38 in a case in which the pseudo object region data 31 is input. In addition, in a case of learning is performed using, as the residual image 37, an image obtained by dividing the first learning data 32 by the pseudo first learning data 32A and showing the ratio of both data, the pseudo residual image 35 generated by the generator 34 also approximates an image obtained by dividing the pseudo first learning data 32A by the first learning data 32 and showing the ratio of both data.

Modification Example of Image Generation Apparatus

Figure 5:
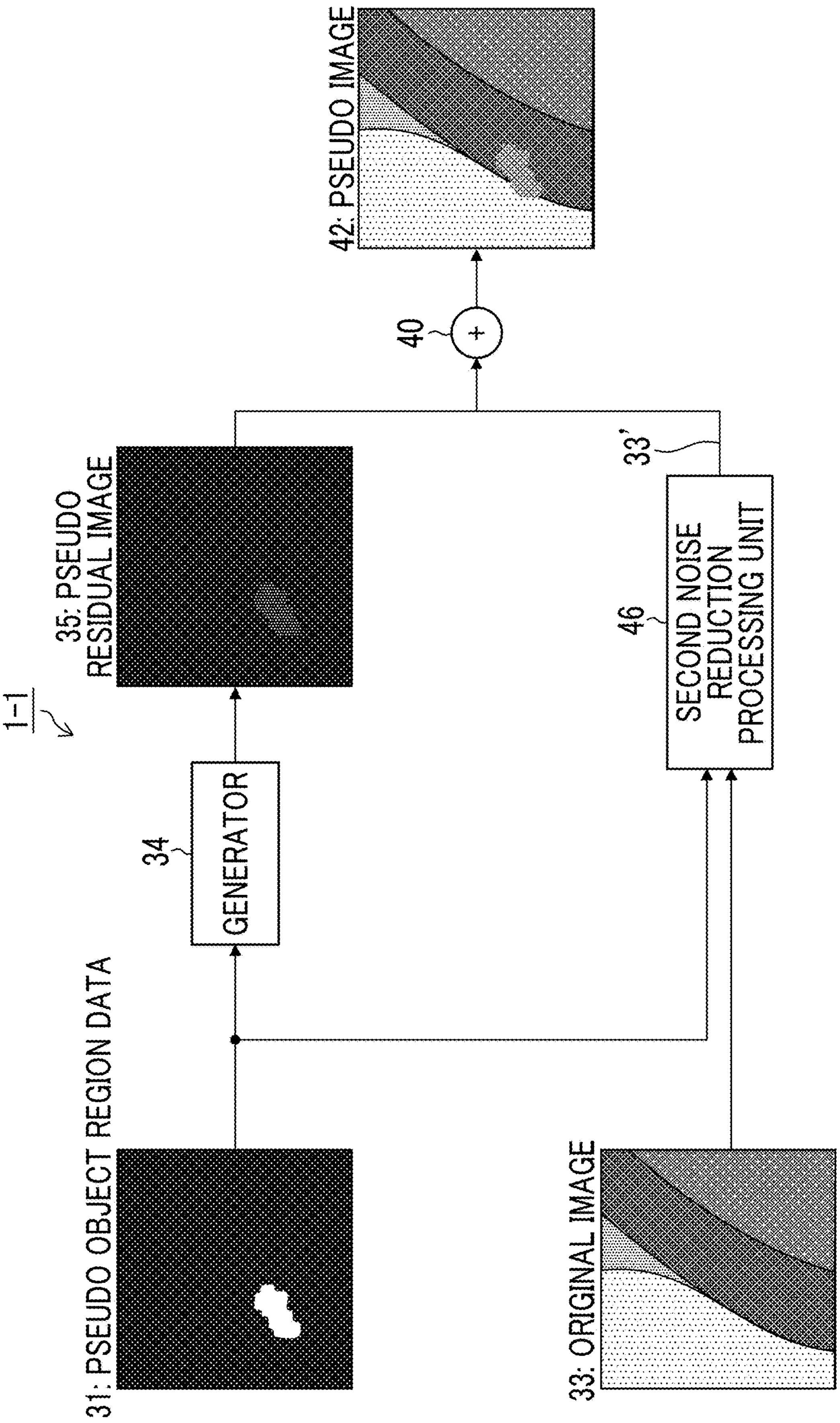
FIG. 5 is a functional block diagram showing a modification example of the image generation apparatus shown in FIG. 2.

FIG. 5 is a functional block diagram showing a modification example of the image generation apparatus shown in FIG. 2.

Note that in FIG. 5, parts common to those in FIG. 2 are denoted by the same reference numerals, and detailed description thereof will be omitted.

An image generation apparatus 1-1 shown in FIG. 5 is different from the image generation apparatus 1 shown in FIG. 2 in that a second noise reduction processing unit 46 is added.

The second noise reduction processing unit 46, which is one function of the processor 10, is a part that performs processing of reducing noise in the pseudo object region (in the present example, interpolation processing for the image within the pseudo object region). The second noise reduction processing unit 46 inputs the original image (test data) 33 and the pseudo object region data 31 and performs second noise reduction processing of reducing noise in at least the pseudo object region indicated by the pseudo object region data 31 of the original image 33. The second noise reduction processing unit 46 reduces noise in the pseudo object region by replacing the brightness value of the pixel in the pseudo object region of the original image 33 with the brightness value obtained by the interpolation algorithm. As the interpolation processing using the interpolation algorithm, processing using polynomial interpolation, spline interpolation, linear interpolation, parabolic interpolation, or cubic interpolation can be applied.

Then, an original image 33' in which the noise in the pseudo object region has been reduced and the pseudo residual image 35 are combined (added, multiplied) to generate a pseudo image 42.

By reducing the noise in the pseudo object region of the original image 33 by the second noise reduction processing unit 46, in the generated pseudo image 42, variations in image texture due to competition between noise components present in the pseudo residual image 35 and noise components originally present in the original image 33 can be reduced, and a more appropriate pseudo image 42 can be generated.

Modification Example of Processing Unit that Constructs Generator

Figure 6:
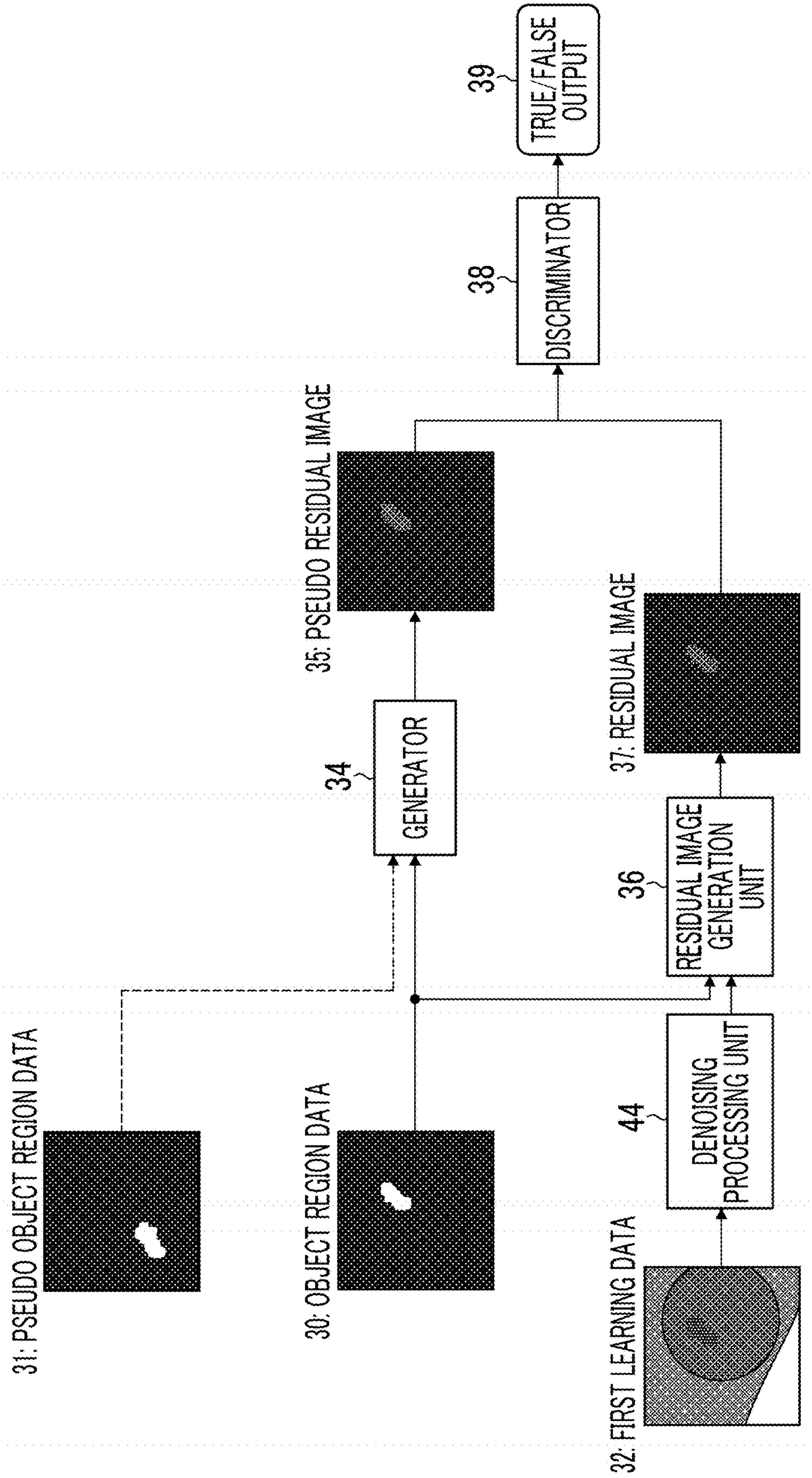
FIG. 6 is a functional block diagram showing a modification example of the processing unit that constructs the generator shown in FIG. 3.

FIG. 6 is a functional block diagram showing a modification example of the processing unit that constructs the generator shown in FIG. 3.

Note that in FIG. 6, parts common to those in FIG. 3 are denoted by the same reference numerals, and detailed description thereof will be omitted.

A modification example of the processing unit that constructs the generator 34 shown in FIG. 6 is different from the embodiment shown in FIG. 3 in that a denoising processing unit (first noise reduction processing unit) 44 is added.

The denoising processing unit 44, which is one function of the processor 10, inputs the first learning data 32, performs noise reduction processing (first noise reduction processing) of reducing noise from the first learning data 32, outputs the first learning data 32 that has been subjected to the first noise reduction processing to the residual image generation unit 36 at the subsequent stage.

The first noise reduction processing by the denoising processing unit 44 is preferably denoising processing using a non-local means (NLM) filter, but the present invention is not limited thereto, and for example, denoising processing using a median filter, a moving average filter, or a Gaussian filter can be applied.

The NLM filter is a filter that performs noise reduction by convolution of support windows with adaptive weights, and is a filter that reduces noise while storing image edges and causes less image deterioration.

Accordingly, in learning the generator 34 or the like, which is a learning model (pseudo residual image generation model) that generates the pseudo residual image 35, it is possible to suppress variations in noise level that are present between individual pieces of first learning data 32 included in the data set, and it is possible to reduce the learning load.

Comparative Example

Next, a comparative example, which is an image generation apparatus that generates learning data (particularly, a pseudo image) using a method different from the image generation apparatus according to the aspect of the present invention, will be described.

Figure 7:
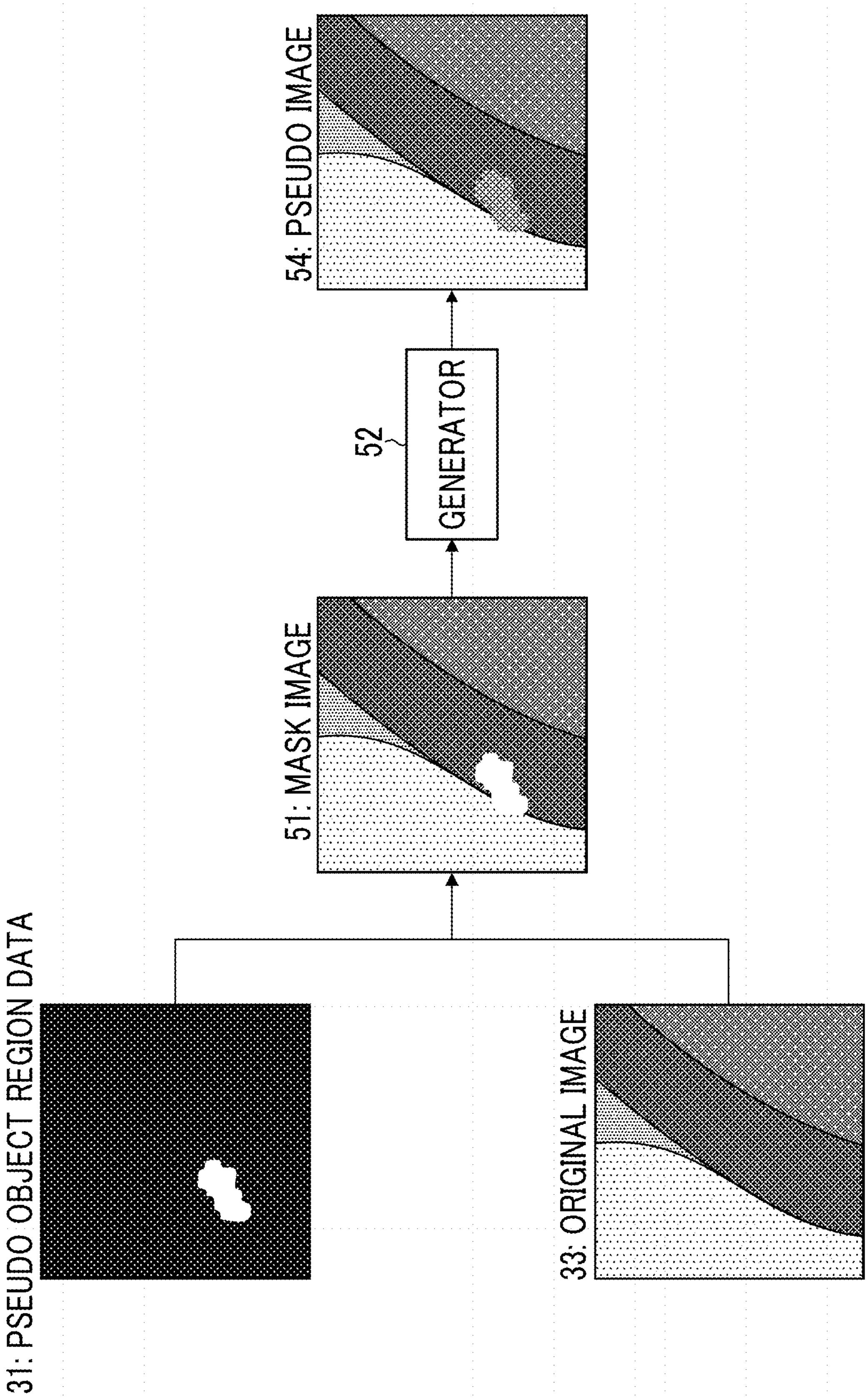
FIG. 7 is a functional block diagram showing an image generation apparatus according to a comparative example.

FIG. 7 is a functional block diagram showing an image generation apparatus according to a comparative example.

In the comparative example, as shown in FIG. 7, first, a mask image 51 is generated from the pseudo object region data 31 and the original image 33. It is assumed that the pseudo object region data 31 and the original image 33 are the same as those input to the image generation apparatus 1 shown in FIG. 2.

The mask image 51 is a mask image generated by superimposing the pseudo object region data 31 on the original image 33, and is an image in which the pseudo object region of the original image 33 is replaced with white (maximum brightness value).

In a case in which the mask image 51 is input, a trained generator 52 generates a pseudo image 54 in which an object image (pseudo object image) is fitted into the pseudo object region of the mask image 51.

Figure 8:
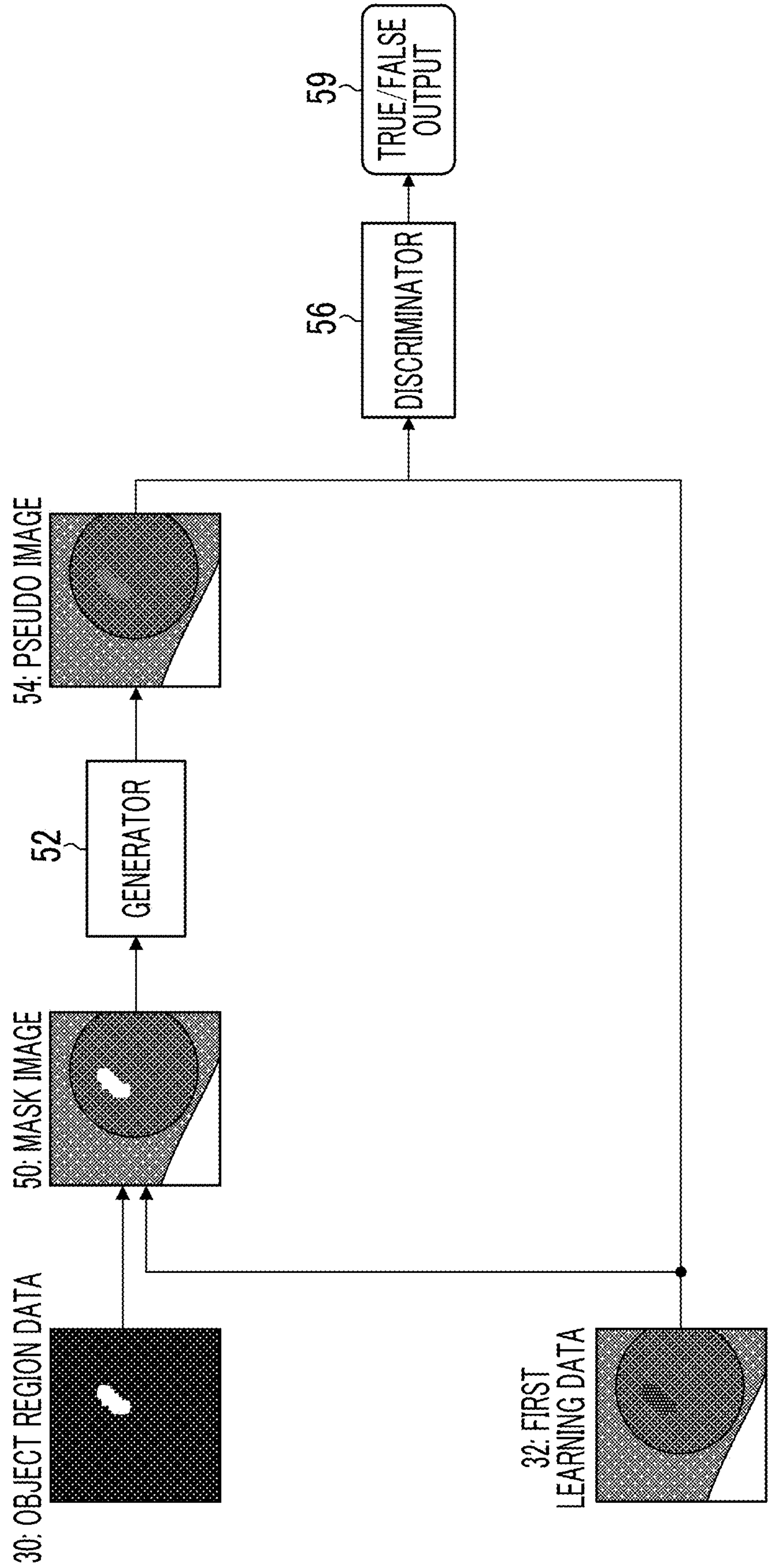
FIG. 8 is a functional block diagram showing a processing unit that constructs a generator shown in FIG. 7.

FIG. 8 is a functional block diagram showing a processing unit that constructs the generator shown in FIG. 7.

In FIG. 8, the processing unit that constructs the generator 52 comprises two neural networks, the generator 52 and a discriminator 56 that configure the GAN, and a mask generation unit (not shown).

A mask image 50 generated from the object region data 30 and the first learning data 32 is input to the generator 52. The mask image 50 can be generated in the same manner as the mask image 51 shown in FIG. 7.

The generator 52 uses the mask image 50 as input data, and machine learning is performed on the generator 52 to generate a pseudo image 54 equivalent to the first learning data 32.

Machine learning is performed on the discriminator 56 to accurately discriminate whether the first learning data 32 and the pseudo image 54 are true or false. Note that the learning of the generator 52 and the discriminator 56 based on a true/false output 59 of the discriminator 56 is performed in the same manner as the generator 34 and the discriminator 38 described above, and thus detailed description thereof will be omitted.

The image generation apparatus 1 according to the aspect of the present invention shown in FIG. 2 inputs pseudo object region data 31 to the trained generator 34, generates a pseudo residual image 35 using the generator 34, and adds the generated pseudo residual image 35 and the original image 33, thereby generating a pseudo image 42 that is paired with the pseudo object region data 31.

On the other hand, in the image generation apparatus according to the comparative example shown in FIG. 7, the generator 52 that receives the mask image 51 as an input directly generates a pseudo image 54 that is paired with the pseudo object region data 31.

In the case of the comparative example, in generating the trained generator 52, when the features of the object region in the first learning data 32 are weak, the burden on the discriminator 56 increases.

On the other hand, since the image generation apparatus 1 according to the aspect of the present invention trains the features of the residual image 37 in the first learning data 32 (features focused only on the residuals), the burden on the discriminator 38 can be reduced.

Further, an image of at least a region other than the pseudo object region in the pseudo image 42 generated by adding the pseudo residual image 35 generated by the generator 34 according to the aspect of the present invention and the original image 33 is an original image 33 (real image), and is a pseudo image closer to the real image than the pseudo image 54 directly generated by the trained generator 52 of the comparative example.

Learning Data Generation Method

Figure 9:
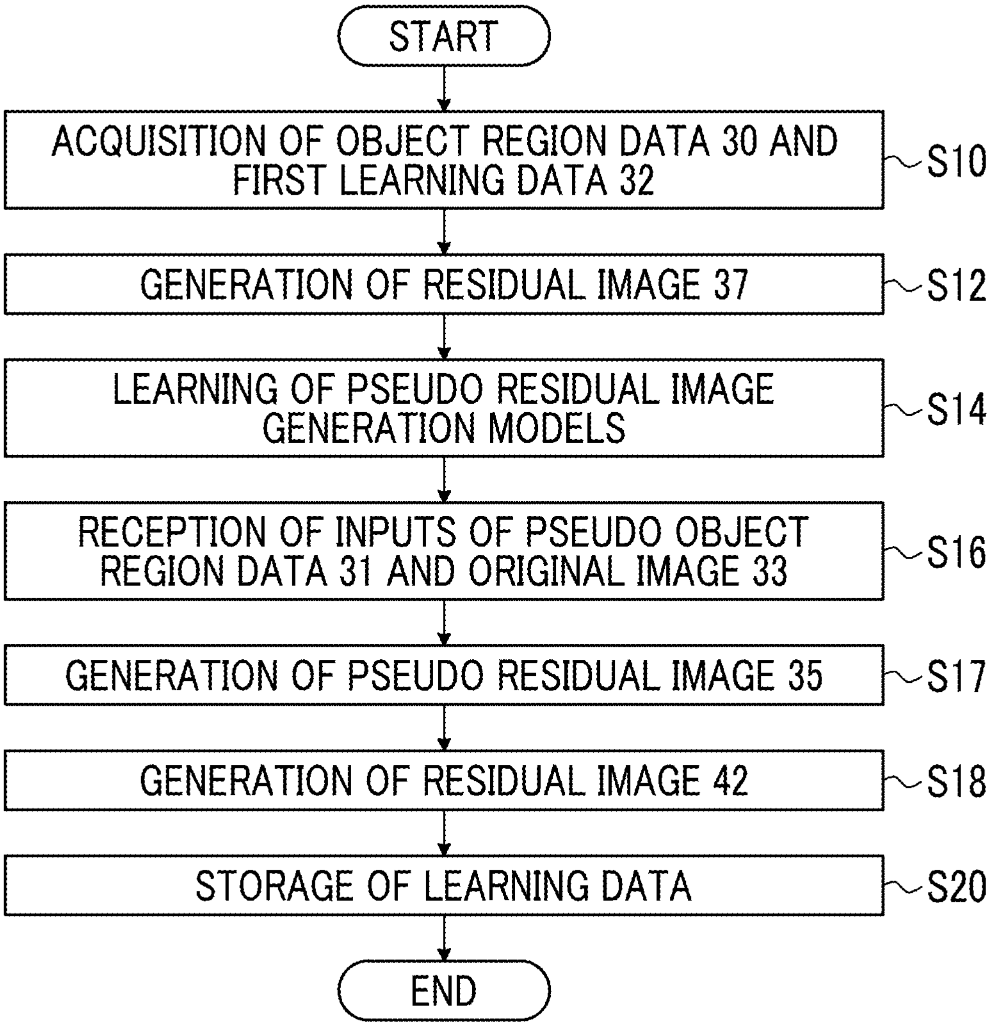
FIG. 9 is a flowchart showing an embodiment of a learning data generation method according to an aspect of the present invention.

FIG. 9 is a flowchart showing an embodiment of a learning data generation method according to an aspect of the present invention.

Processing of each step shown in FIG. 9 is performed by, for example, the processor 10 of the image generation apparatus 1 shown in FIG. 2.

In FIG. 9, the processor 10 (second processor) acquires, from the database 14, the first learning data 32 and at least the object region data 30 out of the object region data 30 and the pseudo object region data 31 indicating the object region of the first learning data 32 (Step S10). Note that the first learning data 32 is a learning image in which an object region is present, and the object region data 30 is correct answer data indicating the object region of the first learning data 32. A large number of learning data sets consisting of pairs of the first learning data 32 and the object region data 30 are generated in advance and are stored in the database 14.

The residual image generation unit 36 of the processor 10 (second processor) generates the residual image 37 based on the first learning data 32 and the object region data 30 as shown in FIG. 4 (Step S12).

Subsequently, as shown in FIG. 3, the processor 10 (second processor) performs learning of the generator 34 and the discriminator 38, which are pseudo residual image generation models, based on the object region data 30 and the residual image 37 (step S14). Thereby, in a case in which the pseudo object region data 31 is input, a trained generator 34 that generates the pseudo residual image 35 is generated.

In a case in which the trained generator 34 is generated, the processor 10 (first processor) receives an input of the pseudo object region data 31 indicating any pseudo object region and the original image 33 by an instruction input or the like from a user (Step S16).

Subsequently, in a case in which the pseudo object region data 31 is input, the generator 34 of the processor 10 (first processor) generates the pseudo residual image 35 to be added to the original image 33 based on the pseudo object region data 31 (Step S17).

The processor 10 (first processor) adds the original image 33 and the pseudo residual image 35 generated in Step S17 to generate a pseudo image 42 obtained in a case in which the pseudo object region is present in the original image 33 (Step S18).

The learning data consisting of the pair of the pseudo image 42 and the pseudo object region data 31 generated in this way is stored in the database 14, for example (Step S20).

The processing of Step S16 to Step S20 is repeatedly executed each time the pseudo object region data 31 is changed, that is, each time the input of the pseudo object region data 31 in which at least one of the position, the size, or the shape of the pseudo object region is different is received. Thereby, learning data can be generated for one original image 33 by the number of pseudo object region data 31 whose pseudo object regions have been changed.

Learning Device

Next, a learning device that uses learning data consisting of the pair of the pseudo image 42 and the pseudo object region data 31 generated as described above and stored in the database 14 to train a learning model (second learning model) for extracting and discriminating an object region from an examination image will be described.

Figure 10:
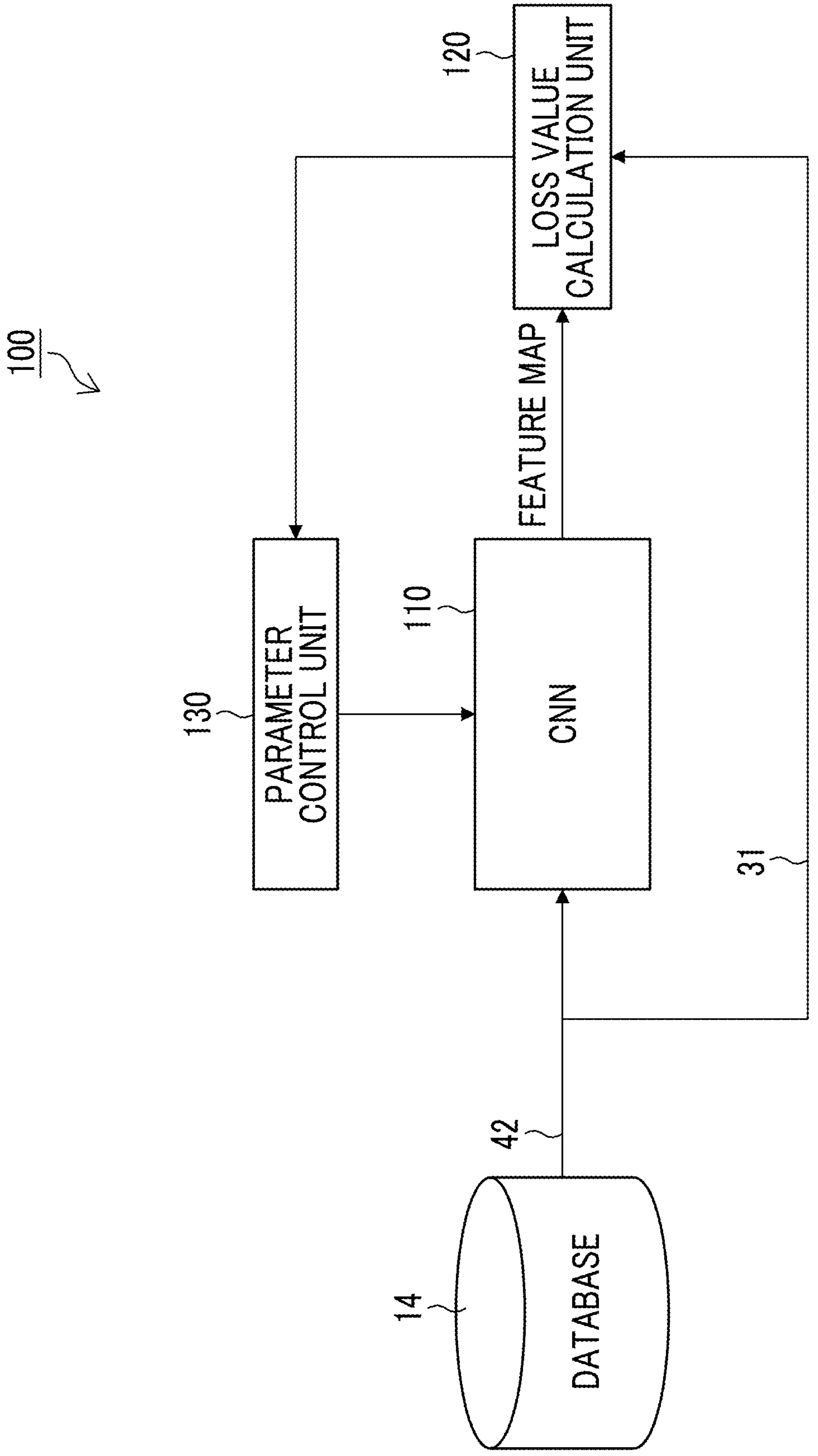
FIG. 10 is a block diagram showing an embodiment of a learning device according to an aspect of the present invention.

FIG. 10 is a block diagram showing an embodiment of a learning device according to an aspect of the present invention.

A learning device 100 shown in FIG. 10 is composed of a second learning model (a convolution neural network (CNN) that is one of learning models) 110 and a processor (third processor), and the third processor includes a loss value calculation unit 120 and a parameter control unit 130.

This learning device 100 uses learning data created by the image generation apparatus 1 shown in FIG. 1 and stored in the database 14 to perform machine learning on the CNN 110.

When an X-ray image obtained by imaging a metal component is used as an input image, the CNN 110 is a part that infers object regions (discontinuity regions, defect regions) shown in the input image, has a plurality of layer structures, and holds a plurality of weight parameters. The weight parameters include filter coefficients of a filter called a kernel used for convolution operations in the convolutional layer.

The CNN 110 can change from an untrained second learning model to a trained second learning model by updating the weight parameter from an initial value to an optimum value.

The third processor causes the CNN 110 to input the pseudo image 42 out of the learning data (the learning data of the pair of the pseudo image 42 and the pseudo object region data 31) stored in the database 14 as an input image.

The trained CNN 110 outputs an inference result obtained by classifying (segmenting) regions such as discontinuities and defects shown in the input image, for example, in units of pixels or in units of groups of some pixels.

Any initial values are set for the filter coefficients and offset values applied to each convolutional layer of the CNN 110 before learning.

The loss value calculation unit 120 out of the loss value calculation unit 120 and the parameter control unit 130 constituting the third processor compares the inference result (feature map) output from the CNN 110 and the pseudo object region data 31 that is correct answer data for the input image (pseudo image 42), and calculates an error between the two (a loss value that is a value of a loss function). Possible methods for calculating the loss value include, for example, softmax cross entropy and sigmoid.

The parameter control unit 130 adjusts the weight parameter of the CNN 110 using a backpropagation method based on the loss value calculated by the loss value calculation unit 120. In the backpropagation method, errors are backpropagated in order from the final layer, a stochastic gradient descent method is performed in each layer, and parameter updates are repeated until the error converges.

This weight parameter adjustment processing is repeatedly performed, and learning is repeatedly performed until a difference between the inference result of the CNN 110 and the pseudo object region data 31 which is correct answer data becomes small.

The learning device 100 repeatedly performs machine learning using a large amount of learning data stored in the database 14, and thus the CNN 110 becomes a trained model. In a case in which an unknown input image (X-ray image obtained by imaging a metal component) is input, the trained CNN 110 outputs an inference result indicating a region of a discontinuity or a defect in the X-ray image.

Note that the learning device 100 is not limited to only the learning data consisting of a pair of the pseudo image 42 and the pseudo object region data 31 and may also use learning data consisting of a pair of first learning data in which an object region is present and object region data indicating the object region of the first learning data for learning of the CNN 110.

Others

Although the image generation apparatus 1 according to the present embodiment performs pseudo residual image generation processing of generating a pseudo residual image 35 from pseudo object region data 31 and pseudo image generation processing of generating a pseudo image 42 by combining the generated pseudo residual image 35 and the original image 33, the present invention also includes an image generation apparatus that generates only the pseudo residual image 35. This is because, in a case in which the pseudo residual image 35 can be generated, the pseudo image 42 can be generated by adding the pseudo residual image to any original image using another apparatus.

Further, in the present embodiment, the generative model that inputs pseudo object region data and outputs a pseudo residual image is the generator 34 trained by a GAN, but the present invention is not limited thereto, and may be a model trained by a variational auto encoder (VAE), for example.

In the image generation apparatus of the present embodiment, the processor within the apparatus also performs learning of the pseudo residual image generation model, but another apparatus physically different from the image generation apparatus may be responsible for learning the pseudo residual image generation model (first learning model). In this case, the image generation apparatus uses a trained first learning model that has been trained by another apparatus.

Further, the image targeted by the present invention is not limited to an X-ray image obtained by imaging a metal component, but can be, for example, a chest X-ray image obtained by imaging a human body, an X-ray computed tomography (CT) image, or other medical images. In the case of medical images, the object region may be a lesion region.

Further, the hardware structure that executes various controls of the image generation apparatus according to the present embodiment is the following various processors. The various processors include a central processing unit (CPU) that is a general-purpose processor functioning as various control units by executing software (program), a programmable logic device (PLD) such as a field-programmable gate array (FPGA) that is a processor having a circuit configuration changeable after manufacture, a dedicated electrical circuit such as an application-specific integrated circuit (ASIC) that is a processor having a circuit configuration dedicatedly designed to execute specific processing, and the like.

One processing unit may be configured by one of various processors, or may be configured by two or more processors of the same type or different types (for example, a plurality of FPGAs or a combination of a CPU and an FPGA). In addition, a plurality of control units may be configured by one processor. As an example of configuring a plurality of control units via one processor, first, as represented by a computer, such as a client or a server, there is a form in which one processor is configured by a combination of one or more CPUs and software, and this processor functions as a plurality of control units. Second, as represented by a system-on-chip (SoC) or the like, there is a form of using a processor for realizing the function of the entire system including a plurality of control units with one integrated circuit (IC) chip. Thus, various control units are configured by using one or more of the above-described various processors as hardware structures.

Further, the present invention includes an image generation program that is installed on a computer to cause the computer to function as the image generation apparatus according to the aspect of the present invention or that causes a computer to execute processing of each step of the image generation method according to the aspect of the present invention, and a non-volatile storage medium on which the image generation program is recorded.

Furthermore, the present invention includes learning data consisting of a pair of a pseudo image and pseudo object region data generated by the image generation method.

Furthermore, it is needless to say that the present invention is not limited to the above-described embodiment and various modifications can be made without departing from the gist of the present invention.

EXPLANATION OF REFERENCES

1, 1-1: image generation apparatus
10: processor
12: memory
14: database 16: display
18: input/output interface
20: operation unit
30: object region data
31: pseudo object region data
32: first learning data
32A: pseudo first learning data
33: original image
34: generator
35: pseudo residual image
36: residual image generation unit
36A: interpolation processing unit
36B: difference calculator
37: residual image
38: discriminator
39: true/false output
40: adder
42: pseudo image
44: denoising processing unit
46: second noise reduction processing unit
50: mask image
51: mask image
52: generator
54: pseudo image
56: discriminator
59: true/false output
100: learning device
110: CNN
120: loss value calculation unit
130: parameter control unit
S10: step
S12: step
S16: step
S17: step
S18: step
S20: step

What is claimed is:

1. An image generation apparatus comprising a first processor and a second processor, wherein the first processor is configured to perform:

first reception processing of receiving an input of pseudo object region data indicating any pseudo object region; and pseudo residual image generation processing of generating a pseudo residual image showing a change in a pixel value given to an original image by a presence of a pseudo object in the pseudo object region, based on the pseudo object region data, and wherein the second processor is configured to perform:

second reception processing of receiving an input of first learning data in which an object region is present and at least object region data indicating the object region of the first learning data out of the object region data and the pseudo object region data;

processing of generating a residual image showing a change in a pixel value given to the first learning data by a presence of an object in the object region, based on the first learning data and the object region data; and processing of generating a first learning model that generates a pseudo residual image corresponding to the residual image from the object region data based on the residual image and at least the object region data out of the object region data and the pseudo object region data, and the pseudo residual image generation processing is executed by the first learning model that has been trained.

2. The image generation apparatus according to claim 1, wherein the processing of generating the residual image includes performing interpolation processing on an image of an object region indicated by the object region data of the first learning data, generating pseudo first learning data in which the change in the pixel value given to the first learning data by the presence of the object is reduced, and generating the residual image based on the first learning data and the pseudo first learning data.

3. The image generation apparatus according to claim 2, wherein the interpolation processing is processing using polynomial interpolation, spline interpolation, linear interpolation, parabolic interpolation, or cubic interpolation.

4. The image generation apparatus according to claim 2, wherein the residual image is generated by subtraction or division between the first learning data and the pseudo first learning data.

5. The image generation apparatus according to claim 1, wherein the second processor is configured to perform first noise reduction processing of reducing noise from the first learning data, and use the first learning data that has been subjected to the first noise reduction processing to generate the residual image.

6. The image generation apparatus according to claim 5, wherein the first noise reduction processing is denoising processing using an NLM filter, a median filter, a moving average filter, or a Gaussian filter.

7. The image generation apparatus according to claim 1, wherein the object region is a region in each image determined based on a specific criterion for an image group.

8. The image generation apparatus according to claim 1, wherein the object region is a defect region that appears in an X-ray image of a metal component.

9. An image generation apparatus comprising a first processor, wherein the first processor is configured to perform:

first reception processing of receiving an input of pseudo object region data indicating any pseudo object region; and pseudo residual image generation processing of generating a pseudo residual image showing a change in a pixel value given to an original image by a presence of a pseudo object in the pseudo object region, based on the pseudo object region data, and wherein the first reception processing includes receiving an input of the original image, and the first processor is configured to perform pseudo image generation processing of generating a pseudo image by combining the pseudo residual image and the original image.

10. The image generation apparatus according to claim 9, wherein the pseudo image generation processing includes generating the pseudo image by addition or multiplication of the pseudo residual image and the original image.

11. An image generation apparatus comprising a first processor, wherein the first processor is configured to perform:

first reception processing of receiving an input of pseudo object region data indicating any pseudo object region; and pseudo residual image generation processing of generating a pseudo residual image showing a change in a pixel value given to an original image by a presence of a pseudo object in the pseudo object region, based on the pseudo object region data, wherein the first reception processing includes receiving an input of the original image, and the first processor is configured to perform pseudo image generation processing of generating a pseudo image by combining the pseudo residual image and the original image, and wherein the first processor is configured to perform second noise reduction processing of reducing noise in at least the pseudo object region of the original image before combining the pseudo residual image and the original image.

12. The image generation apparatus according to claim 11, wherein the second noise reduction processing includes performing interpolation processing on an image in the pseudo object region.

13. The image generation apparatus according to claim 12, wherein the interpolation processing is processing using polynomial interpolation, spline interpolation, linear interpolation, parabolic interpolation, or cubic interpolation.

14. The image generation apparatus according to claim 9, wherein the first processor is configured to generate learning data consisting of a pair of the pseudo image and the pseudo object region data.

15. The image generation apparatus according to claim 14, wherein the first reception processing includes receiving an input of a plurality of pieces of the pseudo object region data in which at least one of a position, a size, or a shape of the pseudo object region is different, and the first processor is configured to generate the learning data for each of the plurality of pieces of received pseudo object region data for the one original image.

16. A learning device comprising a third processor and a second learning model, wherein the third processor is configured to:

acquire learning data generated by an image generation apparatus comprising a first processor, wherein the first processor is configured to perform:

first reception processing of receiving an input of pseudo object region data indicating any pseudo object region; and pseudo residual image generation processing of generating a pseudo residual image showing a change in a pixel value given to an original image by a presence of a pseudo object in the pseudo object region, based on the pseudo object region data, wherein the first reception processing includes receiving an input of the original image, and the first processor is configured to perform pseudo image generation processing of generating a pseudo image by combining the pseudo residual image and the original image, wherein the first processor is configured to generate the learning data consisting of a pair of the pseudo image and the pseudo object region data; and train the second learning model using the learning data, and the second learning model, which has been trained, extracts a region of an object in a case in which an image including the object is input.

17. An image generation method executed by an image generation apparatus including a first processor, the image generation method comprising:

a step of receiving, by the first processor, an input of pseudo object region data indicating any pseudo object region; and a step of generating, by the first processor, a pseudo residual image showing a change in a pixel value given to an original image by a presence of a pseudo object in the pseudo object region, based on the pseudo object region data, wherein the image generation apparatus includes a second processor, the image generation method further comprises:

a step of receiving, by the second processor, an input of first learning data in which an object region is present and at least object region data indicating the object region of the first learning data out of the object region data and the pseudo object region data;

a step of generating, by the second processor, a residual image showing a change in a pixel value given to the first learning data by a presence of an object in the object region, based on the first learning data and the object region data; and a step of generating, by the second processor, a first learning model that generates a pseudo residual image corresponding to the residual image from the object region data based on the residual image and at least the object region data out of the object region data and the pseudo object region data, and the step of generating the pseudo residual image is executed by the first learning model that has been trained.

18. The image generation method according to claim 17, further comprising:

a step of receiving, by the first processor, an input of the original image; and a step of generating, by the first processor, a pseudo image by combining the pseudo residual image and the original image.

19. The image generation method according to claim 18, further comprising: a step of generating, by the first processor, learning data consisting of a pair of the pseudo image and the pseudo object region data.

20. A non-transitory, computer-readable tangible recording medium on which a program for causing, when read by a computer, a first processor provided to the computer to execute the image generation method according to claim 17 is recorded.

* * * * *